Patented Mar. 11, 1952

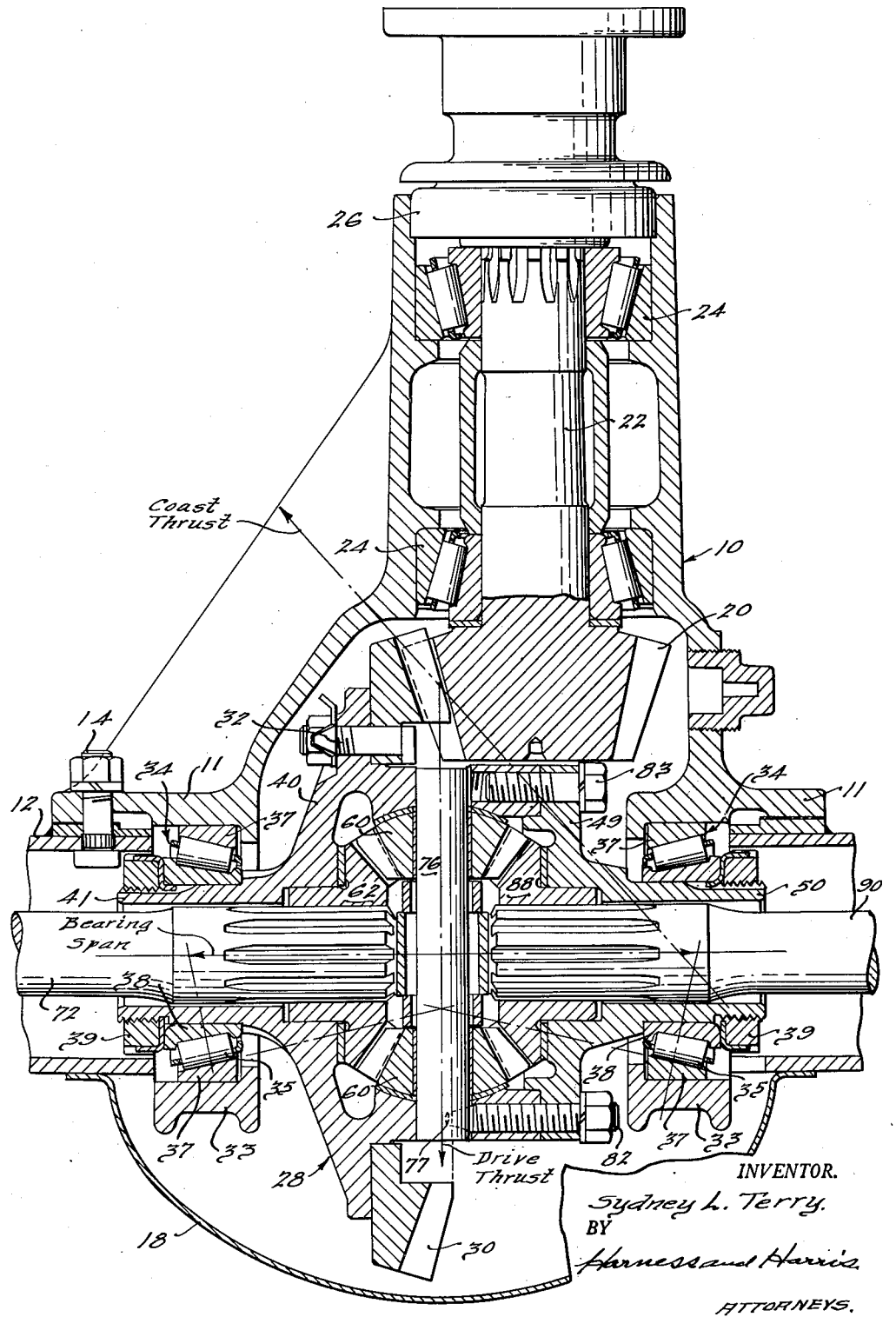

2,588,670

UNITED STATES PATENT OFFICE 2,588,670

DIFFERENTIAL BEARING ARRANGEMENT

Sydney L. Terry, St. Clair Shores, Mich., assignor to Chrysler Corporation, Highland Park, Mich., a corporation of Delaware Application April 21, 1948, Serial No. 22,407

12 Claims. (Cl. 74—713)

This invention relates to an axle assembly and more particularly to the differential bearing arrangement for an automobile driving axle assembly whereby a more rigid and more efficient assembly is obtained by virtue of a novel rearrangement of the conventional axle assembly elements.

It is an object of this invention to provide an improved axle assembly that substantially reduces or eliminates transverse deflection of the ring gear on coast drive while providing efficient means for the transmission of positive forward drive. This diminution of the ring gear deflection on coast drive has been accomplished by a specific arrangement of the conventional differential bearings whereby the stresses and strains within the axle assembly are more efficiently utilized to oppose the forces causing ring gear deflection.

Another object of this invention is to provide an improved axle assembly that substantially reduces or eliminates tipping or cocking of the ring gear on coast drive. This object is achieved as a result of a differential bearing arrangement that provides an effective turning moment to oppose the coast thrust turning moment tending to tip or cock the ring gear on coast drive.

It is another object of this invention to provide an improved axle assembly that reduces the differential bearing loads on coast drive without affecting the bearing loads on positive drive. Due to the reversed bearing arrangement herein disclosed the effective span between the differential bearings is increased and consequently the lever arm for the bearing load turning moment opposing the coast thrust turning moment is increased and this reduces the magnitude of the differential bearing load.

Another object of this invention is to provide a differential bearing arrangement that increases the bearing life. As a result of the differential bearing arrangement herein disclosed the coast thrust is applied to the differential bearing having the highest radial load and this increases the rigidity of that bearing by wedging the bearing rollers against the bearing races which causes all the rollers of that bearing to be held in position and to carry a portion of the load. As the reversed bearing arrangement herein disclosed causes the coast thrust to be resisted by the most rigid bearing of the pair of bearings supporting the differential case, the possibility of loose bearing fit is reduced and the bearing life is increased.

It is another object of this invention to provide a differential bearing arrangement that increases the rigidity and strength of the differential case on coast drive over that of a case supported by the conventional bearing arrangement. With the reversed bearing arrangement herein disclosed the differential case transfers the coast thrust from the ring gear to the resisting bearing in substantially direct tension whereas with a conventional bearing arrangement the case must withstand large bending moments in addition to the direct tension forces.

It is a further object of this invention to provide a differential bearing arrangement that increases the rigidity and strength of the carrier member. The reversed differential bearing arrangement herein disclosed allows the drive pinion thrust on coast drive to be taken by the differential bearing on the same side of the carrier as the offsetting drive pinion bearing load. With the conventional differential bearing arrangement the drive pinion bearing load must be transmitted from one side of the carrier unit around the bolt circle of the carrier unit to the differential bearing on the other side of the assembly. The reversed differential bearing arrangement is such that a much smaller portion of the carrier case is required to carry the resisting thrust load and consequently the rigidity of the case is improved.

It is an additional object of this invention to provide a reversed bearing arrangement that effectively resists the detrimental effects of the coast thrust while providing a satisfactory bearing support wherein the inner races of the bearings are the rotatable members and the outer races are the fixed, carrier supported members.

Other objects and advantages of this invention will fully appear from the following description taken in connection with the accompanying drawing, the figure of which represents a sectional elevational view through an automobile driving axle assemby embodying my differential bearing arrangement. The opposite outer ends of the axles have been broken away to permit use of a larger scale to disclose the novel bearing arrangement.

Referring to the drawing, the axle assembly comprises the drive pinion and differential case carrier unit 10 having axle housing 12 connected thereto by bolts 14. The rear central portion of the axle housing 12 has an opening therein adapted to be closed by a cover plate 18 which is bolted or otherwise detachably secured to the housing 12. A drive pinion shaft 22 is journalled in bearings 24, which are mounted in the forward portion of the carrier unit 10. Pinion shaft 22 has the axle drive pinion 20 mounted on its rear end portion. An oil seal 26 extends around the forward end of pinion shaft 22 and is pressed into a seat in the forward end of the carrier unit 10. A two-piece differential case 28 is rotatably supported from the rear portion of the carrier unit 10 by means of a pair of roller-type differential bearings 34. The bearing assemblies 34 are connected to the carrier unit 10 by conventional bearing caps 33. Case 28 carries a ring gear 30 which is fixedly secured thereto by the bolts 32. Ring gear 30 is positioned so as to meshingly engage the drive pinion 20.

The differential bearings 34 are mounted in the separated, outwardly extending arms 11 of the carrier unit 10 so that the axis of the bearings extend transversely to the carrier. The bearing units 34 are mounted with the tapered roller bearings 35 converging inwardly toward the center of the differential case (see broken lines). Due to the mountings of the bearings 34 in the carrier arms 11 in the manner shown, the outer races 37 of the bearings 34 are fixedly supported by the carrier arms 11 and the inner bearing races 38 are free to rotate with the differential case. As a result of this specific differential bearing arrangement it has been found that a wedging action is developed in the right differential bearing 34, on coast drive, which action resists the coast thrust between the drive pinion 20 and the ring gear 30 and thus deflection and cocking of the ring gear 30 and its associated members is either materially reduced or eliminated. This reversed differential bearing arrangement, whereby at least one of the differential bearings effectively resists the coast thrust, will be subsequently described in detail.

Threaded rings 39 are mounted on the threaded, outwardly extending, neck portions 41 and 50 respectively of the differential case 28. Rings 39 provide means to adjust the position of the bearings 34 with respect to the differential case 28 and carrier unit 10 and accordingly these rings 39 provide a means for accurately positioning the differential case and for preloading the differential bearings during assembly of the axle unit. A buttress thread is provided between the rings 39 and the differential case neck portions 41 and 50 to obtain maximum thrust for a given size thread.

The differential casing 28 is formed in two parts, a cup part 40 and a cap part 49 respectively, so that it will be easier to machine the inner surfaces of the casing to provide bearing seats for the gears mounted therein. The cup part 40 is provided with a neck portion 41 adapted to receive a differential bearing 34 and an adjusting ring 39. The cup part 40 serves as the main body portion of the differential case 28 and has its inner portion machined to receive the two differential pinions 60 and one of the differential side gears 62. Axle 72 is splined to the side gear 62 so as to transmit drive from the side gear 62 to the driven wheel (not shown) carried by the outer end of the axle 72. The cap part 49 of the two-piece differential casing 28 has an outwardly extending neck portion 50 adapted to receive a differential bearing 34 and an adjusting ring 39. The other side gear 88 is rotatably mounted in the cap part of the differential casing 28. An axle 90 is splined to the side gear 88 and consequently is rotatable therewith.

The differential pinion gears 60 are journalled on a differential pinion shaft 76 which is mounted in diametrically disposed openings in the side wall portion of the cup part 40 of the differential case 28. The shaft 76 is held in assembled position by a combination casing bolt and set screw 82 which is threaded through the side wall portion of the casing cup part 40. The differential pinion shaft 76 is counterbored adjacent one of its end portions, as shown at 77, to provide an opening to receive the tapered end of the combination casing bolt and set screw 82. Conventional bolts 83 are used to secure the cap part 49 to the cup part 40 of the differential case 28. The several gears of the axle assembly are so arranged that torque may be transmitted from the drive pinion 20 to the ring gear 30 and through the pinion gears 60 to the side gears 62 and 88 respectively which latter gears drive the axle shafts 72 and 90 respectively.

It is well known that on positive forward drive the engagement of the conventional hypoid drive pinion with the ring gear creates a drive thrust that is rearwardly and substantially longitudinal, as indicated on the drawing. This drive thrust is taken substantially equally by the right and left differential bearings. However, on coast drive, due to the hypoid gearing, the coast thrust extends forwardly and to the left, as shown, and this creates a transversely directed force component that tends to shift the ring gear, differential case and associated elements forwardly and towards the left.

Prior to my invention it has been common practice to mount the tapered roller-type, differential bearings so that the roller bearing tapers converge outwardly away from the center of the differential case. Consequently, on coast drive, the right differential bearing can not resist the lateral or transverse force component of the coast thrust and the left bearing is ineffectively located to completely counteract the effects of the coast thrust. As a result, this transverse or lateral force component of the coast drive thrust tends to shift the ring gear and its associated members towards the left side of the assembly. Due to the structural inability of the right differential bearing of the conventional differential bearing arrangement to resist this transverse shift of the ring gear and its associated parts, on coast drive, pressure is removed from the right bearing and this creates a loose fit in the right bearing. As a result of the loose fit in the right bearing and the application of the transverse force component to the forward edge of the ring gear, on coast drive, the turning moment applied to the forward edge of the ring gear, tends to tip or cock the ring gear with respect to the drive pinion centerline. Accordingly, on coast drive, with the conventional bearing arrangement the coast thrust is resisted by a turning moment acting through the left bearing, the lever arm of which is the distance between the center of this bearing and the line of the coast thrust. With the reversed bearing arrangement the coast thrust extends through the center of the right bearing which resists this load and consequently the resisting turning moment is substantially reduced or eliminated.

Prior to my invention various methods have been used to reduce or eliminate the transverse movements of the ring gear and associated members on coast drive. Two sets of differential bearings have been used to support each side of the differential case, the adjacent sets of bearings tapering in opposite directions. Such an arrangement is costly and increases the size of the axle assembly. Another expedient used to reduce the shift of the ring gear on coast drive has been the mounting of an adjustable backing bearing against the outer side of the ring gear adjacent the point of mesh with the drive pinion. The use of these additional bearings increases the size and cost of the assembly and reduces its efficiency due to the fact that increased frictional resistance to rotation of the ring gear results.

By reversing the conventional arrangement of the differential bearings so that the roller bearing tapers converge inwardly toward the center of the differential case, the right differential bearing effectively resists any force which would have a tendency to shift or twist the ring gear towards the left. It will be noted that with the reverse bearing arrangement herein disclosed the right bearing rollers are placed under pressure on coast drive and are forced into a tight wedge-fit with their supporting races which prevents a transverse movement of the ring gear or its associated members during the application of the coast thrust force. On positive drive with this reversed bearing arrangement there are no transverse force components which tend to shift the ring gear in a transverse direction therefore this reversed bearing arrangement does not alter the function of the bearings on positive drive but does eliminate or materially reduce any tendencies of the ring gear and its associated members to shift during coast drive. This reversed bearing arrangement does not require special or additional parts and does not require additional skill or time to assemble or adjust.

It will be noted that the coast thrust acts along a line that extends through the right differential bearing. With the reversed bearing arrangement this thrust tends to maintain the right bearing under pressure and increases the rigidity of his bearing rather than relieving this bearing of pressure as is the case with the conventional bearing arrangement. Also, as a result of the reversed bearing arrangement the effective span between the differential bearings is increased for the span is measured between the points where perpendiculars from the center of the tapered roller bearings cross the axes of the bearings. Obviously if the tapers of the roller bearings converge inwardly then the bearing span is greater than when the bearing tapers converge outwardly. This increased bearing span increases the lever arm of the moment resisting the coast thrust therefor the bearing load is accordingly reduced.

It has been found from tests comparing a conventional differential bearing arrangement with a similar reversed bearing arrangement that the separation of the ring gear from the drive pinion, on coast drive, measured adjacent the mesh point of these gears, is reduced as much as 65 per cent by the reversed bearing arrangement. Even more spectacular improvement is achieved in the reduction of ring gear tipping or cocking. It was found that as much as 80 per cent of the normal ring gear tipping on coast drive was eliminated by the reversed bearing arrangement. These results are thought to justify the conclusion that an improved differential bearing arrangement has been provided which does not require an additional expenditure of time, labor, materials or the like.

I claim:

1. An axle assembly comprising a differential carrier, a driving pinion journaled in said carrier for rotation about an axis extending longitudinally thereof, a two-piece differential case rotatably mounted on said carrier for rotation about an axis extending transversely thereof, said differential case comprising a cup member carrying a driven gear positioned for driving engagement with said pinion, a side gear journaled in the bottom portion of said cup member, a differential pinion shaft carried by the cup member, the end portions of said shaft being mounted in the side wall portion of said cup member, pinion gears mounted on said pinion shaft, a removable cap member for the open end of said cup member, a side gear journalled in the inner face of said cap member, the gears within said case being interconnected for the transmission of torque, casing bolts connecting said cap member to said cup member, sleeve-like neck portions carried by the casing cup and cap members arranged to extend transversely to said carrier member, and spaced roller bearing assemblies mounted on said carrier and positioned on opposite sides of said driven gear so as to rotatably support the neck portions of said case, the said bearing assemblies including concentrically arranged inner and outer races having roller bearings mounted therebetween and arranged so that the bearings of each assembly converge towards the driven gear, the outer races of said bearing assemblies being fixedly connected to carrier member and the inner races being connected to the neck portions of said case for rotation therewith.

2. In a drive transmitting assembly, a drive pinion carrier having a drive pinion journaled therein for rotation about an axis extending longitudinally thereof, a pair of spaced-apart, aligned, differential bearing assemblies fixedly mounted on said carrier, said bearing assemblies being positioned on opposite sides of said drive pinion and arranged to extend longitudinally of the carrier, each of said bearing assemblies comprising an outer annular race fixed to said carrier, a rotatable inner annular race arranged concentrically within said outer race, and a plurality of tapered roller bearings supported between said inner and outer races, the roller bearings of each bearing assembly extending transversely to the carrier and converging inwardly towards the other bearing assembly, a differential case mounted between said bearing assemblies and rotatably supported by the inner races thereof in a manner restraining transverse and longitudinal movement of said case relative to said carrier, said differential case having a ring gear mounted thereon arranged to extend between and parallel to said bearing assemblies, the gear meshingly engaging said drive pinion.

3. In a drive transmitting assembly, a drive pinion carrier having a drive pinion journaled therein for rotation about an axis extending longitudinally thereof, a pair of spaced-apart, aligned, differential bearing assemblies fixedly mounted on said carrier, said bearing assemblies being positioned on opposite sides of said drive pinion and arranged to extend longitudinally of the carrier, each of said bearing assemblies comprising an outer annular race fixed to said carrier in a manner preventing shift of the bearing assemblies towards one another, a rotatable inner annular race arranged concentrically within said outer race, and a plurality of tapered roller bearings supported between said inner and outer races, the roller bearings of each bearing assembly extending transversely to the carrier and converging inwardly towards the other bearing assembly, a differential case mounted between said bearing assemblies and rotatably supported by the inner races thereof in a manner restraining transverse and longitudinal movement of said case relative to said carrier, said differential case having a ring gear mounted thereon arranged to extend between and parallel to said bearing assemblies, the gear meshingly engaging said drive pinion, the mounting of the bearing assemblies in the carrier and case being such that the bearing on the toothed side of the ring gear resists deflection of the ring gear on coast drive.

4. An axle assembly comprising a drive pinion carrier unit having a pair of aligned, separated arms projecting therefrom and extending longitudinally of the carrier unit, a roller bearing assembly carried by each of said arms and aligned therewith, said bearing assemblies each comprising an outer race fixedly mounted in an arm, a rotatable inner race spaced from and carried by the outer race, and a set of tapered roller bearings rotatably supported between said races with the roller bearing tapers extending transversely to the arm and converging towards the other arm, a drive pinion journaled in said carrier for rotation about an axis extending longitudinally thereof, a differential case fixedly mounted between and rotatably supported by the inner races of said bearing assemblies for rotation about an axis normal to the rotational axis of said drive pinion, a ring gear mounted on said case between said bearing assemblies and arranged parallel thereto, said ring gear drivingly engaging said drive pinion, the bearing assembly on the toothed side of said ring gear resisting shift of the ring gear towards the other bearing assembly.

5. An axle assembly comprising a drive pinion carrier unit having a pair of aligned, separated arms projecting therefrom and extending longitudinally of the carrier unit, a roller bearing assembly carried by each of said arms and aligned therewith, said bearing assemblies each comprising an outer race fixedly mounted in an arm, a rotatable inner race spaced from and carried by the outer race, and a set of tapered roller bearings rotatably supported between said races with the bearings extending transversely to the arm and converging towards the other arm, a drive pinion journaled in said carrier for rotation about an axis extending longitudinally thereof, a differential case fixedly mounted between and rotatably supported by the inner races of said bearing assemblies for rotation about an axis normal to the rotational axis of said drive pinion, a ring gear mounted on said case between said bearing assemblies and arranged parallel thereto, said ring gear drivingly engaging said drive pinion, the bearing assembly on the toothed side of said ring gear resisting shift of the ring gear towards the other bearing assembly, and means carried by said case and engageable with the inner races of said bearing assemblies to preload said bearing assemblies.

6. An axle assembly comprising a drive pinion carrier unit, a drive pinion journaled in said carrier unit, a pair of spaced, alined, differential bearings mounted on said carrier, a differential case positioned between and rotatably supported by said bearings for rotation about an axis normal to the rotational axis of said drive pinion, and a ring gear mounted on said case and positioned to meshingly engage said drive pinion, said differential bearings each comprising an outer race, an inner race and a set of tapered roller bearings mounted between said races, the tapers of said roller bearings extending transversely to and converging inwardly towards said case, the outer races of said bearings being fixedly connected to said carrier in a manner preventing shift of said bearings towards the ring gear and the inner races of said bearings being connected to and rotatable with said case, the differential bearing on the toothed side of the ring gear wedgingly resisting shift of said ring gear away from the drive pinion.

7. An axle assembly comprising a drive pinion carrier unit, a drive pinion journaled in said carrier unit, a pair of spaced, alined, differential bearings mounted on said carrier, a differential case positioned between and rotatably supported by said bearings for rotation about an axis normal to the rotational axis of said drive pinion, and a ring gear mounted on said case and positioned to meshingly engage said drive pinion, said differential bearings each comprising an outer race, an inner race and a set of roller bearings mounted between said races, the roller bearings of each set extending transversely to and converging inwardly towards said case, the bearing on the toothed side of said ring gear having the outer race thereof fixedly connected to the carrier in a manner preventing shift of the bearing towards the ring gear, the differential bearing on the toothed side of the ring gear wedgingly resisting shift of said ring gear away from the drive pinion.

8. An axle assembly comprising a drive pinion carrier, a hypoid type driving pinion journalled on said carrier, a differential case supported by said carrier, said differential case carrying a hypoid type driven gear positioned for driving engagement with said pinion, side gears and pinion gears mounted within said case and interconnected for the transmission of torque, axle shafts connected to each of said side gears, and a pair of roller bearing assemblies fixedly mounted on said carrier and positioned on opposite sides of said driven gear so as to rotatably mount said case on said carrier, the bearing assemblies including concentrically arranged inner and outer races having rollers arranged therebetween such that the rollers of the bearing assembly on the driving side of said driven gear converge towards said driven gear, the outer races of said bearing assemblies being fixedly connected to said carrier in a manner preventing shift of said bearing assemblies towards each other and the inner races of said bearing being connected to said case for rotation therewith, the bearing on the toothed side of the ring gear resisting separation of the driving pinion and the driven gear.

9. In axle assembly comprising a drive pinion carrier, a hypoid driving pinion journalled on said carrier, a differential case rotatably supported by said carrier, said differential case carrying a hypoid driven gear positioned for driving engagement with said pinion, side gears and pinion gears mounted within said case and interconnected for the transmission of torque, axle shafts connected to each of said side gears, a pair of roller bearing assemblies mounted on said carrier and positioned on opposite sides of said driven gear so as to rotatably mount said case on said carrier, the bearing assemblies including inner and outer races with tapered rollers therebetween arranged such that the rollers of the bearing assembly on the driving side of said driven gear converge towards said driven gear, the outer races of said bearing assemblies being fixedly connected to said carrier in a manner preventing shift of said bearing assemblies towards each other and the inner races of said bearing being connected to said case for rotation therewith, the bearing on the toothed side of the ring gear resisting separation of the driving pinion and the driven gear, and threaded adjusting means carried by said case adapted to provide means to preload said bearing assemblies and to position said case within said carrier.

10. An axle assembly comprising a drive pinion carrier member, a drive pinion journaled in said carrier, a differential case, a pair of spaced differential bearings each comprising inner and outer races encircling sets of axially extending, tapered, roller-type, bearings, said differential bearings rotatably supporting said case on said carrier for rotation about an axis transverse to the rotational axis of said pinion, and a ring gear carried by said case and positioned so as to meshingly engage said drive pinion, said differential bearings extending parallel to and being positioned on opposite sides of said ring gear with the tapered rollers thereof converging towards said ring gear and having the outer races thereof rigidly connected to said carrier, the inner races fixedly anchored to said case for rotation therewith, and the tapered rollers wedgingly retained between the said races, the differential bearing on the toothed side of said ring gear wedgingly resisting the transverse component of the coast thrust and being located along the directional line of the coast thrust.

11. An axle assembly comprising a drive pinion carrier member, a drive pinion journaled in said carrier, a differential case, a pair of spaced differential bearings each comprising inner and outer races encircling sets of axially extending, tapered, roller-type, bearings, said differential bearings rotatably supporting said case on said carrier for rotation about an axis extending transverse to the rotational axis of said pinion, and a ring gear carried by said case and positioned so as to meshingly engage said drive pinion, said differential bearings extending parallel to and being positioned on opposite sides of said ring gear with the tapered rollers thereof converging towards said ring gear and having the outer races thereof rigidly connected to said carrier, the inner races fixedly anchored to said case for rotation therewith, and the tapered rollers wedgingly retained between the said races, the differential bearing on the toothed side of said ring gear wedgingly resisting the transverse component of the coast thrust.

12. An axle assembly comprising a drive pinion carrier unit, a drive pinion journaled in said carrier unit, a pair of spaced, aligned, differential bearings mounted on said carrier, a differential case positioned between and rotatably supported by said bearings for rotation about an axis normal to the rotational axis of said drive pinion, and a ring gear mounted on said case and positioned to meshingly engage said drive pinion, said differential bearings each comprising an outer race fixedly mounted in said carrier, an inner race anchored to and adapted to support and rotate with said differential case, and a set of tapered roller bearings wedgingly mounted between said races with the bearing tapers each converging inwardly towards the intermediately positioned portions of said differential case, the bearing on the drive pinion side of said ring gear having the rollers thereof supported to wedgingly resist shift of the ring gear transversely away therefrom.

SYDNEY L. TERRY.

REFERENCES CITED

The following references are of record in the file of this patent:

UNITED STATES PATENTS

| Number | Name | Date |
|---|---|---|
| 1,575,176 | Moorhouse | Mar. 2, 1926 |
| 1,614,992 | Roberts | Jan. 18, 1927 |
| 1,744,179 | Tibbetts | Jan. 21, 1930 |
| 1,880,655 | Baits | Oct. 4, 1932 |
| 2,016,343 | Oberem | Oct. 8, 1935 |
| 2,037,961 | Boden | Apr. 21, 1936 |
| 2,050,344 | Lapham | Aug. 11, 1936 |
| 2,061,009 | Rothrock | Nov. 17, 1936 |
| 2,219,025 | Vanderberg | Oct. 22, 1940 |